US012403765B2

(12) United States Patent
Ono

(10) Patent No.: US 12,403,765 B2
(45) Date of Patent: Sep. 2, 2025

(54) ALL-WHEEL DRIVE SYSTEM

(71) Applicant: SUBARU CORPORATION, Tokyo (JP)

(72) Inventor: Akira Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 448 days.

(21) Appl. No.: 17/877,496

(22) Filed: Jul. 29, 2022

(65) Prior Publication Data

US 2023/0081563 A1     Mar. 16, 2023

(30) Foreign Application Priority Data

Sep. 13, 2021   (JP) ................................. 2021-148294

(51) Int. Cl.
*B60K 23/08*     (2006.01)
*B60K 23/04*     (2006.01)

(52) U.S. Cl.
CPC .......... *B60K 23/04* (2013.01); *B60K 23/0808* (2013.01); *B60K 2023/043* (2013.01); *B60K 2023/0816* (2013.01); *B60K 2023/085* (2013.01)

(58) Field of Classification Search
CPC ................ B60K 23/04; B60K 23/0808; B60K 2023/043; B60K 2023/0816;
(Continued)

(56) References Cited

U.S. PATENT DOCUMENTS

| 7,331,896 B1* | 2/2008 | Kroppe ................. B60K 17/35 475/221 |
| 2006/0162981 A1* | 7/2006 | Kurosawa .......... B60K 17/3462 180/249 |

(Continued)

FOREIGN PATENT DOCUMENTS

| JP | 6331826 A | 2/1988 |
| JP | H02225139 A | 9/1990 |

(Continued)

OTHER PUBLICATIONS

Japanese Office Action for Japanese Patent Application No. 2021-148294, dated May 27, 2025 with English Translation.

*Primary Examiner* — Justin Holmes
(74) *Attorney, Agent, or Firm* — McGinn I.P.Law Group, PLLC

(57) ABSTRACT

An all-wheel drive system includes a center differential, a limited-slip differential clutch, a front-wheel torque transmission system, a rear-wheel torque transmission system, and a controller. The center differential distributes torque between front and rear wheels of a vehicle. The limited-slip differential clutch limits a differential operation of the center differential in accordance with an engaging pressure, and changes a front-rear torque distribution ratio between the front and rear wheels. The front-wheel torque transmission system transmits torque between the center differential and the front wheels. The rear-wheel torque transmission system transmits torque between the center differential and the rear wheels. The controller adjusts the engaging pressure based on a driving state of the vehicle. Reduction ratios of the front-wheel and rear-wheel torque transmission systems are set different from each other. The center differential is configured such that the front-rear torque distribution ratio is initially unequal and is changeable.

20 Claims, 4 Drawing Sheets

(58) Field of Classification Search
CPC ...... B60K 2023/085; B60K 2023/0866; B60K 17/35; B60K 5/02; B60Y 2400/424; B60Y 2400/426; B60Y 2400/72
See application file for complete search history.

(56) References Cited

U.S. PATENT DOCUMENTS

2008/0027615 A1    1/2008  Nagura et al.
2018/0290540 A1*  10/2018  Tsuji ................. B60K 23/0808

FOREIGN PATENT DOCUMENTS

| JP | H03118230 A | * | 5/1991 |
| --- | --- | --- | --- |
| JP | H0699758 A | | 4/1994 |
| JP | H0672728 U | | 10/1994 |
| JP | H11-28942 A | | 2/1999 |
| JP | 200830626 A | | 2/2008 |
| JP | 4519216 B2 | * | 8/2010 |
| JP | 2011143855 A | | 7/2011 |

* cited by examiner

ALL-WHEEL DRIVE SYSTEM

CROSS-REFERENCE TO RELATED APPLICATIONS

The present application claims priority from Japanese Patent Application No. 2021-148294 filed on Sep. 13, 2021, the entire contents of which are hereby incorporated by reference.

BACKGROUND

The disclosure relates to an all-wheel drive system.

An example of an all-wheel drive (AWD) vehicle (or 4-wheel drive (4WD) vehicle) that has been put to use includes drive wheels directly driven by an engine and driven wheels coupled to the engine with a transfer clutch provided therebetween. An engaging force of the transfer clutch is controlled in accordance with, for example, a driving state to adjust a torque allocated to the driven wheels.

Such a coupling all-wheel drive vehicle (torque-split part-time all-wheel drive vehicle) including the transfer clutch is capable of changing a torque distribution ratio between the drive wheels and the driven wheels in the range of 100:0 (drive wheels to driven wheels) to 50:50 by adjusting the engaging pressure (engaging force) of the transfer clutch (by disengaging and engaging the transfer clutch). When, for example, the all-wheel drive vehicle is FF-based, the front-rear torque distribution ratio is changeable in the range of 100:0 (front to rear) and 50:50.

Japanese Unexamined Patent Application Publication (JP-A) No. H11-28942 discloses a four-wheel drive vehicle including a control coupling (transfer clutch) provided on a transmission path along which a driving force for drive wheels is transmitted toward driven wheels to control a transmission ratio of the driving force transmitted to the driven wheels. A gear ratio of the driven wheels is set to a ratio greater than a gear ratio of the drive wheels so that a reduction ratio of the driven wheels is greater than a reduction ratio of the drive wheels, thereby enabling the ratio between the driving force of the driven wheels and the driving force of the drive wheels (front-rear torque distribution ratio) to be changed over a range greater than the range from 0:1 to 1:1.

In one example, this four-wheel drive vehicle is configured such that an output/input gear ratio of a front differential is set to 1 and an output/input gear ratio of a rear differential is set to 1.03 to 1.17. Therefore, the four-wheel drive vehicle is capable of changing the driving state over a wide range from a front-wheel driving state (front biased) to a state close to a rear-wheel driving state (rear biased).

SUMMARY

An aspect of the disclosure provides an all-wheel drive system including a center differential, a limited-slip differential clutch, a front-wheel torque transmission system, a rear-wheel torque transmission system, and a controller. The center differential is configured to distribute torque input thereto between front wheels and rear wheels of a vehicle. The limited-slip differential clutch is configured to limit a differential operation of the center differential in accordance with an engaging pressure and change a front-rear torque distribution ratio between the front wheels and the rear wheels. The front-wheel torque transmission system is configured to transmit torque between the center differential and the front wheels. The rear-wheel torque transmission system is configured to transmit torque between the center differential and the rear wheels. The controller is configured to adjust the engaging pressure of the limited-slip differential clutch based on a driving state of the vehicle. A reduction ratio of the front-wheel torque transmission system and a reduction ratio of the rear-wheel torque transmission system are set to be different from each other. The center differential is configured such that the front-rear torque distribution ratio is initially unequal and is changeable.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

According to the all-wheel drive (AWD) vehicle described in JP-A No. H11-28942, the gear ratio of the driven wheels (for example, rear wheels) is set to a ratio greater than the gear ratio of the drive wheels (for example, front wheels) so that the reduction ratio of the driven wheels is greater than the reduction ratio of the drive wheels, thereby enabling the ratio between the torque of the driven wheels and the torque of the drive wheels (front-rear torque distribution ratio) to be changed over a range greater than the range from 0:1 (rear-to-front) to 1:1. In other words, according to the all-wheel drive (AWD) described in JP-A No. H11-28942, the reduction ratio (gear ratio) of the front wheels and the reduction ratio (gear ratio) of the rear wheels are set to different ratios. When, for example, the front wheels are drive wheels, the front-rear torque distribution ratio can be changed from an initial front-biased ratio to a rear-biased ratio by increasing the engaging pressure of the transfer clutch.

However, according to the all-wheel drive vehicle described in JP-A No. H11-28942, the transfer clutch constantly slips because the reduction ratio (gear ratio) of the front wheels and the reduction ratio (gear ratio) of the rear wheels are set to different ratios. Therefore, there are problems of thermal damage, strength, durability, etc. of the transfer clutch. In addition, since a large clutch engaging pressure (engaging force) is generated to achieve a rear-biased state, there is also a problem of loss in, for example, an oil pump that generates a hydraulic pressure.

It is desirable to provide an all-wheel drive system capable of changing a front-rear torque distribution ratio from a front-biased ratio to a rear-biased ratio, suppressing thermal damage to a clutch that changes the front-rear torque distribution ratio, and reducing loss in, for example, an oil pump.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
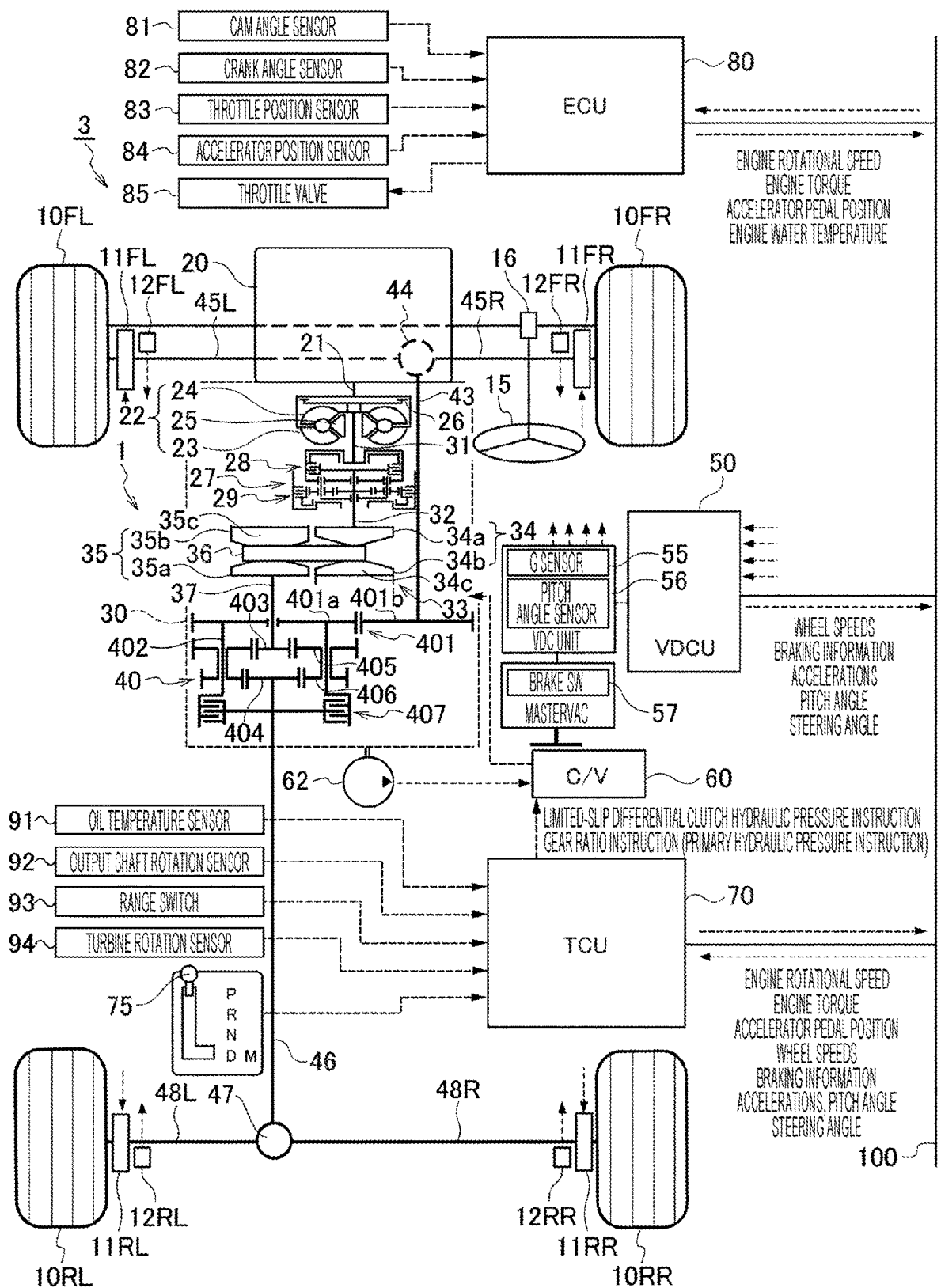
FIG. 1 illustrates the overall configuration of an all-wheel drive system according to an embodiment of the disclosure.

The configuration of an all-wheel drive system 1 according to an embodiment will be described with reference to FIG. 1. FIG. 1 illustrates the overall configuration of the all-wheel drive system 1 and an all-wheel drive (AWD) vehicle 3 including the all-wheel drive system 1.

An engine 20 may be any engine, for example, a horizontally-opposed four-cylinder direct injection gasoline engine. Air introduced into the engine 20 through an air cleaner (not illustrated) is regulated by an electronically controlled throttle valve (hereinafter also referred to simply as a "throttle valve") 85 provided in an intake pipe, flows through an intake manifold, and is introduced into each cylinder of the engine 20. The amount of air introduced through the air cleaner is detected by an air flow meter. The throttle valve 85 is provided with a throttle position sensor 83 that detects the position of the throttle valve 85. An injector for injecting fuel is attached to each cylinder. A spark plug that ignites an air-fuel mixture and a coil provided with a built-in igniter that applies a high voltage to the spark plug are also attached to each cylinder. The air-fuel mixture containing the introduced air and fuel injected by the injector is ignited by the spark plug and combusted in each cylinder of the engine 20. Exhaust gas generated by the combustion is discharged through an exhaust pipe.

In addition to the air flow meter and the throttle position sensor 83 described above, a cam angle sensor 81 for cylinder identification of the engine 20 is disposed near a cam shaft of the engine 20. A crank angle sensor 82 that detects the position of a crank shaft 21 of the engine 20 is disposed near the crank shaft 21. These sensors are coupled to an engine control unit (hereinafter referred to as an "ECU") 80 described below. Various other sensors including an accelerator position sensor 84 and a water temperature sensor are also coupled to the ECU 80. The accelerator position sensor 84 detects the amount by which an accelerator pedal is depressed, that is, an accelerator pedal position. The water temperature sensor detects the temperature of cooling water of the engine 20.

The crank shaft 21 of the engine 20 is coupled to a continuously variable transmission 30 by which a torque from the engine 20 is converted and output through a torque converter 22 having a clutch function and a torque increasing function and a forward/reverse switching mechanism 27.

The torque converter 22 mainly includes a pump impeller 23, a turbine runner 24, and a stator 25. The pump impeller 23, which is coupled to the crank shaft 21, produces a flow of oil. The turbine runner 24, which is disposed to face the pump impeller 23, receives power from the engine 20 through the oil and drives a turbine shaft 31. The stator 25, which is positioned between the pump impeller 23 and the turbine runner 24, regulates an exit (returning) flow from the turbine runner 24 and returns the flow to the pump impeller 23 to produce a torque increasing effect.

The torque converter 22 also includes a lockup clutch 26 that provides a direct input-output coupling. When the lockup clutch 26 is not engaged (in a non-lockup state), the torque converter 22 increases the torque from the engine 20 and transmits the increased torque to the continuously variable transmission 30. When the lockup clutch 26 is engaged (in a lockup state), the torque converter 22 directly transmits the torque from the engine 20 to the continuously variable transmission 30. The rotational speed (turbine rotational speed) of the turbine runner 24 included in the torque converter 22 is detected by a turbine rotation sensor 94. The detected turbine rotational speed is output to a transmission control unit (hereinafter referred to as a "TCU") 70 described below.

The forward/reverse switching mechanism 27 enables switching between forward and reverse rotations of drive wheels 10, which are a left front wheel 10FL, a right front wheel 10FR, a left rear wheel 10RL, and a right rear wheel 10RR (between forward and reverse movements of the vehicle). The forward/reverse switching mechanism 27 mainly includes a double-pinion planetary gear train, a forward clutch 28, and a reverse brake 29. The forward/reverse switching mechanism 27 is capable of switching a transmission path along which the engine torque is transmitted by controlling the states of the forward clutch 28 and the reverse brake 29.

In one example, when a drive (D) range is selected, the forward clutch 28 is engaged and the reverse brake 29 is disengaged so that the rotation of the turbine shaft 31 is directly transmitted to a primary shaft 32 described below to enable the vehicle to move forward. When a reverse (R) range is selected, the forward clutch 28 is disengaged and the reverse brake 29 is engaged so that the planetary gear train is activated and the rotational direction of the primary shaft 32 is reversed to enable the vehicle to move rearward.

When a neutral (N) range or a parking (P) range is selected, the forward clutch 28 and the reverse brake 29 are both disengaged so that the turbine shaft 31 and the primary shaft 32 are separated from each other (transmission of the engine torque is blocked). Thus, the forward/reverse switching mechanism 27 is set to a neutral state in which no power is transmitted to the primary shaft 32. The operations of the forward clutch 28 and the reverse brake 29 are controlled by the TCU 70 and a control valve (valve body) 60.

The continuously variable transmission 30 includes a transmission mechanism (variator) 33 including the primary shaft 32, which is coupled to the turbine shaft 31 of the torque converter 22 with the forward/reverse switching mechanism 27 provided therebetween, and a secondary shaft 37 disposed parallel to the primary shaft 32.

The continuously variable transmission 30 includes the primary shaft 32 coupled to the turbine shaft 31 of the torque converter 22 with the forward/reverse switching mechanism 27 provided therebetween and the secondary shaft 37 disposed parallel to the primary shaft 32. The primary shaft 32 is provided with a primary pulley 34. The primary pulley 34 includes a fixed sheave 34a joined to the primary shaft 32 and a movable sheave 34b facing the fixed sheave 34a and mounted slidably in an axial direction of the primary shaft 32. Thus, the primary pulley 34 is configured to have a variable pulley groove width, which is an interval between conical surfaces of the sheaves 34a and 34b. The secondary shaft 37 is provided with a secondary pulley 35. The secondary pulley 35 includes a fixed sheave 35a joined to the secondary shaft 37 and a movable sheave 35b facing the fixed sheave 35a and mounted slidably in an axial direction of the secondary shaft 37. Thus, the secondary pulley 35 is configured to have a variable pulley groove width.

A chain 36 used to transmit the torque is wrapped around the primary pulley 34 and the secondary pulley 35. The gear ratio is changed seamlessly by changing the groove widths of the primary pulley 34 and the secondary pulley 35 and changing a ratio between diameters of portions of the chain 36 wrapped around the pulleys 34 and 35 (pulley ratio). When Rp is the diameter of the portion of the chain 36 wrapped around the primary pulley 34 and Rs is the diameter of the portion of the chain 36 wrapped around the secondary pulley 35, a gear ratio i is determined by i=Rs/Rp. Therefore, the gear ratio i is obtained by dividing a primary pulley rotational speed Np by a secondary pulley rotational speed Ns (i=Np/Ns).

The primary pulley 34 (movable sheave 34b) has a hydraulic chamber 34c. The secondary pulley 35 (movable sheave 35b) has a hydraulic chamber 35c. The groove widths of the primary pulley 34 and the secondary pulley 35 are set and changed by adjusting a primary hydraulic pressure applied to the hydraulic chamber 34c of the primary pulley 34 and a secondary hydraulic pressure applied to the hydraulic chamber 35c of the secondary pulley 35.

The secondary shaft 37 of the continuously variable transmission 30 is coupled to a center differential 40 (described in detail below) that distributes the input torque between the front wheels and the rear wheels. The torque converted by the continuously variable transmission 30 is distributed between the front wheels and the rear wheels at a predetermined torque distribution ratio (described in detail below) by the center differential 40. The torque allocated to the front wheels by the center differential 40 is transmitted to a front differential 44 through a transfer gearset 401 (transfer drive gear 401a and transfer driven gear 401b) and a front drive shaft 43. The front differential 44 is, for example, a bevel-gear differential. The torque from the front differential 44 is transmitted to the left front wheel 10FL through a left-front-wheel drive shaft 45L and to the right front wheel 10FR through a right-front-wheel drive shaft 45R. In one embodiment, the transfer gearset 401 (transfer drive gear 401a and transfer driven gear 401b), the front drive shaft 43, the front differential 44, the left-front-wheel drive shaft 45L, and the right-front-wheel drive shaft 45R may serve as a "front-wheel torque transmission system".

The torque allocated to the rear wheels by the center differential 40 is transmitted to a rear differential 47 through a propeller shaft 46 that extends toward the rear of the vehicle. The rear differential 47 is coupled to a left-rear-wheel drive shaft 48L and a right-rear-wheel drive shaft 48R. The torque from the rear differential 47 is transmitted to the left rear wheel 10RL through the left-rear-wheel drive shaft 48L and to the right rear wheel 10RR through the right-rear-wheel drive shaft 48R. In one embodiment, the propeller shaft 46, the rear differential 47, the left-rear-wheel drive shaft 48L, and the right-rear-wheel drive shaft 48R may serve as a "rear-wheel torque transmission system".

The reduction ratio (total gear ratio) of the front-wheel torque transmission system and the reduction ratio (total gear ratio) of the rear-wheel torque transmission system are set to different ratios. For example, in the present embodiment, the gear ratios of the transfer gearset 401, the front differential 44, and the rear differential 47 are set so that the reduction ratio (total gear ratio) of the front-wheel torque transmission system is less than the reduction ratio (total gear ratio) of the rear-wheel torque transmission system. In other words, in the present embodiment, the gear ratios are set so that the following expression is satisfied: (gear ratio of the transfer gearset 401)×(gear ratio of the front differential 44)<(gear ratio of the rear differential 47). Therefore, the following expression is satisfied: (rotational speeds of the rear wheels 10RL and 10RR)<(rotational speeds of the front wheels 10FL and 10FR).

A secondary shaft 37 is rotatably inserted in the center differential 40 from the front of a carrier 402 that is rotatably housed in the center differential 40. The propeller shaft 46 is rotatably inserted in the center differential 40 from the rear.

A first sun gear 403 having a small diameter is attached to the rear end of the secondary shaft 37 at the input side, and a second sun gear 404 having a large diameter is attached to the front end of the propeller shaft 46 through which torque is output to the rear wheels 10RL and TORR. The first sun gear 403 and the second sun gear 404 are disposed in the carrier 402.

The first sun gear 403 meshes with first pinion gears 405 having a large diameter to form a first gear train, and the second sun gear 404 meshes with second pinion gears 406 having a small diameter to form a second gear train. The first pinion gears 405 and the second pinion gears 406 are permanently affixed to each other so that a plurality of pairs (for example, three pairs) of pinion gears are rotatably supported by the carrier 402. The transfer drive gear 401a is coupled to the front end of the carrier 402, so that torque is output from the carrier 402 to the front wheels.

Thus, the center differential 40 has a compound planetary gear system having no ring gear and configured such that the torque from the secondary shaft 37 is transmitted to the first sun gear 403 and output to the propeller shaft 46 from the second sun gear 404, and is also output to the front drive shaft 43 from the carrier 402 through the transfer drive gear 401a and the transfer driven gear 401b.

The center differential 40 having the compound planetary gear system provides a differential function by appropriately setting the numbers of teeth of the first and second sun gears 403 and 404 and a plurality of pairs of first and second pinion gears 405 and 406 disposed around the sun gears 403 and 404.

By appropriately setting the meshing pitch circle radii of the first and second sun gears 403 and 404 and the first and second pinion gears 405 and 406 (=torque ratio), a reference (initial) torque distribution may be set to an equal torque distribution of 50:50 (front to rear) or an unequal torque distribution that is front biased or rear biased. In the present embodiment, the front-rear torque distribution ratio of the center differential 40 in an initial state is set to for example, 80:20 (front to rear) and is front biased (torque allocated to the front wheels>torque allocated to the rear wheels).

In one example, the center differential 40 is configured such that the front-rear torque distribution ratio is set to an unequal ratio in the initial state and is changeable (that is, changeable by changing the meshing pitch circle radii of the first and second sun gears 403 and 404 and the first and second pinion gears 405 and 406).

A limited-slip differential (LSD) clutch 407 that employs a hydraulic multiple disc clutch is provided between the carrier 402 of the center differential 40 and the propeller shaft 46. The limited-slip differential clutch 407 limits the differential operation of the center differential 40 and changes the front-rear torque distribution ratio between the front wheels and the rear wheels (torque distribution between the front and rear wheels). The front-rear torque distribution ratio is changeable in the range of, for example, 80:20 to 20:80 by controlling an engaging force of the limited-slip differential clutch 407. An engaging pressure (engaging force) of the limited-slip differential clutch 407 is controlled by the TCU 70 and the control valve (valve body) 60.

According to a power train of a torque transmission system configured as described above, when a selection lever is operated to select the D range, for example, the engine torque is input to the primary shaft 32 of the continuously variable transmission 30. The torque converted by the continuously variable transmission 30 is output from the secondary shaft 37 and distributed between the front wheels and the rear wheels by the center differential 40. When a clutch torque is applied to the limited-slip differential clutch 407, torque is distributed between the front drive shaft 43 and the propeller shaft 46 in accordance with the applied clutch torque.

Torque allocated to the front wheels is transmitted to the front drive shaft 43 and distributed between the left and right front wheels 10FL and 10FR by the front differential 44. Torque allocated to the rear wheels is transmitted to the propeller shaft 46 and distributed between the rear wheels 10RL and 10RR by the rear differential 47.

The wheels 10FL, 10FR, 10RL, and 10RR (hereinafter also referred to collectively as wheels 10) are respectively equipped with brakes 11FL, 11FR, 11RL, and 11RR (hereinafter also referred to collectively as brakes 11) for braking the wheels 10FL, 10FR, 10RL, and 10RR. The wheels 10FL, 10FR, 10RL, and 10RR are also respectively equipped with wheel speed sensors 12FL, 12FR, 12RL, and 12RR (hereinafter also referred to collectively as wheel speed sensors 12) that detect rotational speeds of the wheels 10FL, 10FR, 10RL, and 10RR.

In the present embodiment, disc brakes are used as the brakes 11. Each brake 11 includes a brake disc attached to the corresponding wheel 10 of the AWD vehicle 3 and a brake caliper in which a brake pad and a wheel cylinder are mounted. During braking, the brake pad is hydraulically pressed against the brake disc, and the resultant frictional force brakes the wheel 10 coupled to the brake disc. Although a disc brake is used as each brake 11 in the present embodiment, other brakes, such as a drum brake that presses a friction material against an inner peripheral surface of a drum, may instead be used.

Each wheel speed sensor 12 is a contactless sensor that detects a change in a magnetic field produced by a rotor (gear rotor or magnetic rotor) that rotates together with the corresponding wheel 10. For example, a semiconductor sensor that detects the rotation of the rotor with a Hall element or an MR element may be suitably used.

The AWD vehicle 3 also includes a vehicle dynamics control (VDC) unit (hereinafter abbreviated as "VDCU") 50 that prevents skidding and ensures high traveling stability when, for example, the AWD vehicle 3 enters a corner at an excessive speed or when the position (behavior) of the AWD vehicle 3 becomes unstable due to an abrupt steering operation.

The hydraulic pressures allowing the continuously variable transmission 30 to change the gear ratio, that is, the primary hydraulic pressure and the secondary hydraulic pressure described above, are controlled by the control valve (valve body) 60. The valve body 60 adjusts the hydraulic pressure supplied from an oil pump 62 by opening and closing an oil passage formed in the valve body 60 by using a spool valve and a solenoid valve (electromagnetic valve) that moves the spool valve, and supplies the adjusted hydraulic pressure to each of the hydraulic chamber 34c of the primary pulley 34 and the hydraulic chamber 35c of the secondary pulley 35. Similarly, the control valve 60 adjusts the hydraulic pressure supplied from the oil pump 62 by opening and closing an oil passage formed in the valve body 60 by using a spool valve and a solenoid valve (electromagnetic valve) that moves the spool valve, and supplies the adjusted hydraulic pressure as a hydraulic pressure for adjusting the engaging pressure (engaging force) of the limited-slip differential clutch 407. The solenoid valve used to adjust the hydraulic pressure supplied to the limited-slip differential clutch 407 may be, for example, a duty solenoid capable of controlling the amount by which the solenoid is driven in accordance with a duty ratio of a voltage applied thereto.

Transmission control of the continuously variable transmission 30 is performed by the TCU 70. In one example, the TCU 70 adjust the hydraulic pressure supplied to each of the hydraulic chamber 34c of the primary pulley 34 and the hydraulic chamber 35c of the secondary pulley 35 by controlling the operation of the solenoid valve (electromagnetic valve) included in the above-described valve body 60, and thereby changes the gear ratio of the continuously variable transmission 30. Similarly, the TCU 70 adjusts the hydraulic pressure supplied to the limited-slip differential clutch 407 by controlling the operation of the solenoid valve included in the above-described control valve 60, and thereby adjusts the distribution ratio between the torque transmitted to the front wheels 10FL and 10FR and the torque transmitted to the rear wheels 10RL and 10RR (front-rear torque distribution ratio).

A shift lever (selection lever) 75 that receives an operation performed by the driver to select an operational state (range) of the continuously variable transmission 30 is provided on, for example, a floor (center console) of the vehicle. A range switch 93 that moves together with the shift lever 75 and detects the selected position of the shift lever 75 is coupled to the shift lever 75. The range switch 93 is also coupled to the TCU 70, and the detected selected position of the shift lever 75 is read by the TCU 70. The shift lever 75 can be selectively switched between the drive (D) range, a manual (M) range, the parking (P) range, the reverse (R) range, and the neutral (N) range. A selecting switch mechanism may be used instead of the shift lever 75.

When the shift lever 75 is operated to select the D range (forward driving range), oil is supplied to the hydraulic chamber of the forward clutch 28 and discharged from the hydraulic chamber of the reverse brake 29. Accordingly, the forward clutch 28 is engaged and the reverse brake 29 is disengaged to enable forward driving of the vehicle. When the shift lever 75 is operated to select the R range (reverse driving range), oil is supplied to the hydraulic chamber of the reverse brake 29 and discharged from the hydraulic chamber of the forward clutch 28. Accordingly, the reverse brake 29 is engaged and the forward clutch 28 is disengaged to enable reverse driving of the vehicle. When the shift lever 75 is operated to select the N range or the P range, oil is discharged from both the hydraulic chamber of the forward clutch 28 and the hydraulic chamber of the reverse brake 29. Accordingly, the forward clutch 28 and the reverse brake 29 are both disengaged (transmission of the engine torque is blocked) so that the continuously variable transmission 30 is set to a neutral state.

As described above, the TCU 70 performs the transmission control of the continuously variable transmission 30, the engagement/disengagement control (forward-reverse switch control) of the forward clutch 28 and the reverse brake 29, and the engaging pressure control (front-rear torque distribution control) of the limited-slip differential clutch 407. The TCU 70 is coupled to the ECU 80 that controls the overall operation of the engine 20, the VDCU 50, and other units through, for example, a controller area network (CAN) 100 that enables intercommunication therebetween.

Each of the TCU 70, the ECU 80, and the VDCU 50 includes a microprocessor that performs computation, an electrically erasable programmable read-only memory (EEPROM) that stores a program for causing the microprocessor to execute each process, a random access memory (RAM) that stores various data, such as computation results, a backup RAM that holds contents stored therein by using a battery, and an input/output interface (I/F).

The ECU 80 performs cylinder identification based on the output of the cam angle sensor 81 and determines the engine rotational speed based on a change in the rotational position of the crank shaft detected from the output of the crank angle sensor 82. The ECU 80 also acquires various information including an amount of air introduced, the accelerator pedal position, the air-fuel ratio of the air-fuel mixture, and a water temperature based on detection signals input from various sensors described above. The ECU 80 controls the overall operation of the engine 20 by controlling an amount of fuel injection, ignition timing, and various devices including the throttle valve 85 based on the acquired information.

The ECU 80 also transmits various information including the engine water temperature (cooling water temperature), the accelerator pedal position, the engine rotational speed, and the engine torque to the TCU 70 through the CAN 100.

The VDCU 50 is coupled to the four wheel speed sensors 12FL, 12FR, 12RL, and 12RR, a steering angle sensor 16, an acceleration (G) sensor 55, a pitch angle sensor 56, and a brake switch 57. As described above, the wheel speed sensors 12FL, 12FR, 12RL, and 12RR respectively detect the rotational states of the wheels 10FL, 10FR, 10RL, and 10RR by detecting the rotations of gears attached to the centers of the wheels 10FL, 10FR, 10RL, and 10RR with, for example, magnetic pickups. The acceleration sensor 55 detects accelerations applied to the AWD vehicle 3 in the front-rear and sideways directions. The pitch angle sensor 56 detects a rotation angle around an axis passing through the center of gravity of the AWD vehicle 3 and extending through the vehicle body in the vehicle width direction (road gradient). The steering angle sensor 16 detects a steered angle of the front wheels 10FL and 10FR that are steered wheels (that is, a steering angle of a steering wheel 15) by detecting a rotation angle of a pinion shaft.

The VDCU 50 brakes the vehicle by driving brake actuators in accordance with an amount by which a brake pedal is operated (depressed). The VDCU 50 also detects the behavior of the vehicle by using various sensors (for example, the wheel speed sensors 12, the steering angle sensor 16, the acceleration sensor 55, the pitch angle sensor 56, and a yaw rate sensor) and performs brake control based on automatic pressurization and torque control of the engine 20 to suppress skidding and ensure high vehicle stability during cornering. In other words, the VDCU 50 prevents skidding and ensures high traveling stability when, for example, the vehicle enters a corner at an excessive speed or when the position (behavior) of the vehicle becomes unstable due to an abrupt steering operation. In one example, the VDCU 50 detects the position (behavior) of the vehicle by using the above-described sensors, for example, and performs an automatic control operation depending on a driving state. For example, when oversteering is detected, the VDCU 50 brakes one of the front wheels 10FL and 10FR that is on the outer side of the corner. When understeering is detected, the VDCU 50 reduces the engine power and brakes one of the rear wheels 10RL and 10RR that is on the inner side of the corner. The VDCU 50 also has a function of an antilock braking system (ABS) and a function of a traction control system (TCS) in addition to the VDC (skidding prevention) function.

The VDCU 50 transmits various information including the rotational speeds of the wheels 10, the steering angle, the accelerations, and the pitch angle (road gradient) that have been detected and braking information to the TCU 70 through the CAN 100.

The TCU 70 is coupled not only to the above-described turbine rotation sensor 94 but also to an oil temperature sensor 91 that detects an oil temperature of the continuously variable transmission 30 (that is, an oil temperature of the limited-slip differential clutch 407); an output shaft rotation sensor 92 that detects a rotational speed of the secondary shaft 37 (rotational speed of the secondary pulley 35); and a range switch 93 that detects the selected position of the shift lever.

As above-described, the TCU 70 receives various information including the rotational speeds of the wheels 10, the steering angle, the accelerations, the pitch angle (road gradient), and the braking information from the VDCU 50 through the CAN 100, and also receives information including the engine water temperature, the accelerator pedal position, the engine rotational speed, and the engine torque from the ECU 80 through the CAN 100.

The TCU 70 automatically seamlessly changes the gear ratio depending on the driving state (for example, the accelerator position and the vehicle speed) of the AWD vehicle 3 in accordance with a shift map. The shift map is stored in, for example, the EEPROM of the TCU 70.

The TCU 70 performs limited-slip differential clutch control (front-rear torque distribution control) based on various information acquired from the above-described sensors. For example, the TCU 70 adjusts the engaging force of the limited-slip differential clutch 407 (that is, the front-rear torque distribution ratio) based on the driving state of the AWD vehicle 3 (for example, the steering angle and the pitch angle). In one embodiment, the TCU 70 may serve as a "controller".

In particular, the TCU 70 is capable of changing the front-rear torque distribution ratio from a front-biased ratio to a rear-biased ratio and has functions of suppressing thermal damage to the limited-slip differential clutch 407 that changes the front-rear torque distribution ratio and reducing loss in, for example, the oil pump 62. The TCU 70 realizes these functions by causing the microprocessor to execute a program stored in, for example, the EEPROM.

For example, during accelerated cornering or accelerated climbing, the TCU 70 adjusts the engaging pressure (engaging force) of the limited-slip differential clutch 407 to change the front-rear torque distribution ratio to a rear-biased ratio. In a driving state other than accelerated cornering or accelerated climbing, the TCU 70 disengages the limited-slip differential clutch 407. Accordingly, the front-rear torque distribution ratio is set to a front-biased (initial) ratio.

In one example, the TCU 70 sets the front-rear torque distribution ratio to a rear-biased ratio by increasing the engaging force (engaging pressure) of the limited-slip differential clutch 407 when the torque input to the center differential 40 (engine torque×gear ratio) is greater than or equal to a predetermined torque (for example, 10 Nm) and the steering angle of the steering wheel 15 is greater than or equal to a predetermined angle (for example, 1°), or when the torque input to the center differential 40 is greater than or equal to a predetermined torque (for example, 10 Nm) and the pitch angle of the AWD vehicle 3 (road gradient) is greater than or equal to a predetermined angle (for example, 1°).

The EEPROM of the TCU 70, for example, stores a map (target clutch torque map) defining the relationship between the torque input to the center differential 40, the steering angle of the steering wheel 15, the pitch angle of the AWD vehicle 3 (gradient), and the target clutch torque of the limited-slip differential clutch 407. The target clutch torque of the limited-slip differential clutch 407 is determined based on the steering angle and the pitch angle by referring to the target clutch torque map.

Figure 3:
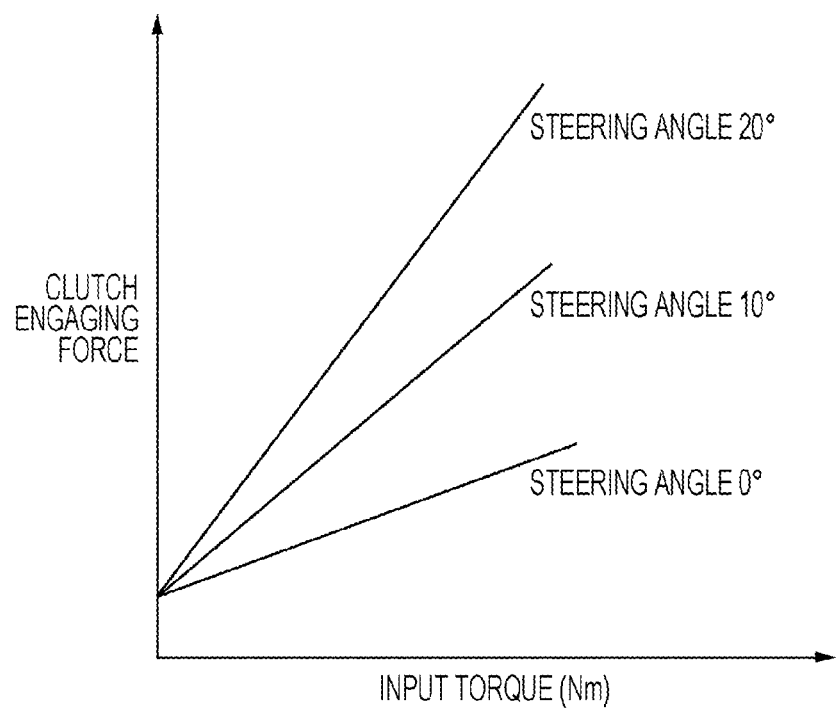
FIG. 3 is a graph illustrating the relationship between the input torque, the steering angle, and the clutch engaging force.
Figure 4:
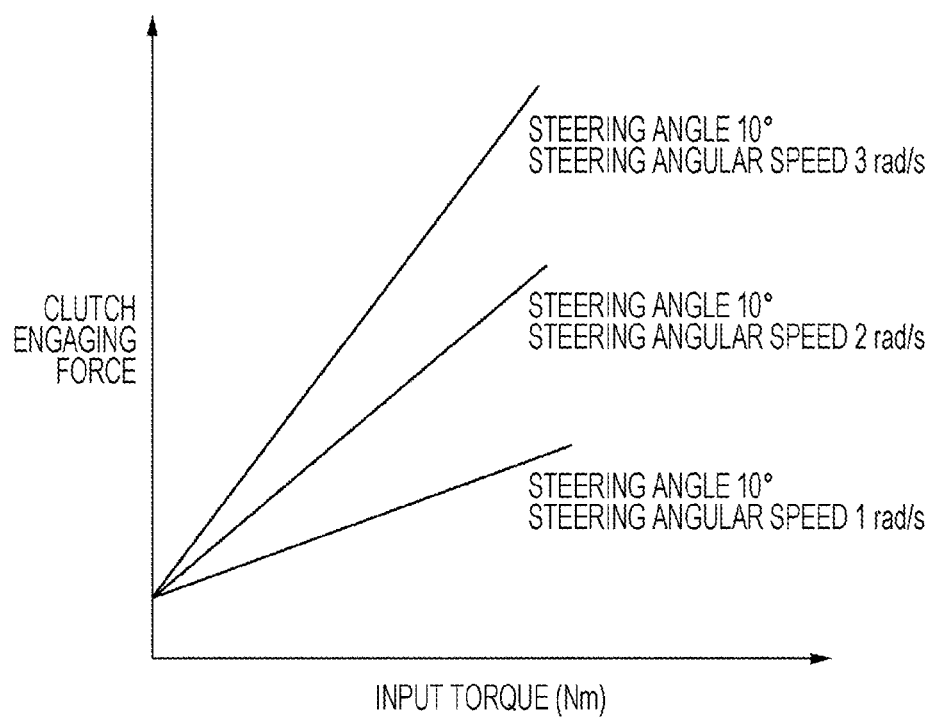
FIG. 4 is a graph illustrating the relationship between the input torque, the steering speed, and the clutch engaging force.

As illustrated in FIG. 3, the TCU 70 increases the engaging pressure (engaging force) of the limited-slip differential clutch 407 in proportion to the steering angle as the steering angle increases. However, when a large clutch engaging force is applied during low-speed cornering, it becomes difficult to turn smoothly (tight corner braking phenomenon). Therefore, the clutch engaging force may not be increased when the steering speed is low. Accordingly, as illustrated in FIG. 4, the TCU 70 increases the engaging pressure (engaging force) of the limited-slip differential clutch 407 in proportion to the steering angular speed as the steering angular speed increases. FIG. 3 is a graph illustrating the relationship between the input torque, the steering angle, and the clutch engaging force. FIG. 4 is a graph illustrating the relationship between the input torque, the steering speed (steering angular speed), and the clutch engaging force.

The TCU 70 disengages the limited-slip differential clutch 407 when the oil temperature of the limited-slip differential clutch 407 (continuously variable transmission 30) is higher than or equal to a predetermined temperature (for example, 80° C.)

Figure 2:
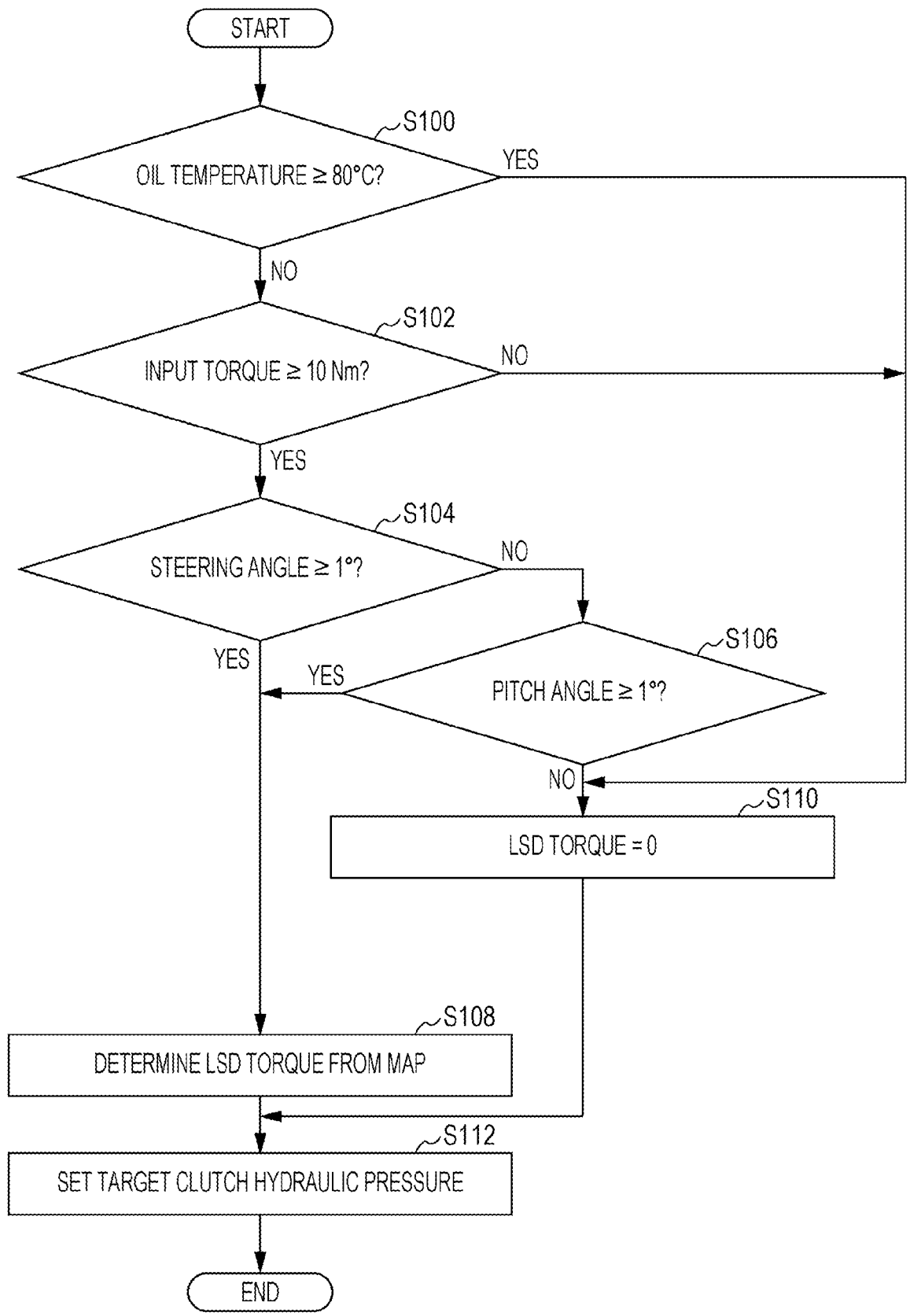
FIG. 2 is a flowchart of a process performed by the all-wheel drive system according to the embodiment to suppress (prevent) thermal damage to a limited-slip differential clutch.

The operation of the all-wheel drive system 1 will now be described with reference to FIG. 2. FIG. 2 is a flowchart of a process performed by the all-wheel drive system 1 to suppress (prevent) thermal damage to the limited-slip differential clutch 407. This process is repeatedly performed mainly by the TCU 70 at a predetermined timing.

In step S100, it is determined whether the oil temperature of the limited-slip differential clutch 407 (continuously variable transmission 30) is higher than or equal to a predetermined temperature (for example, 80° C.) When the oil temperature of the limited-slip differential clutch 407 is higher than or equal to the predetermined temperature, a target clutch torque of the limited-slip differential clutch 407 is set to zero in step S110. After that, in step S112, a target hydraulic pressure of the limited-slip differential clutch 407 is set to zero, and the limited-slip differential clutch 407 is disengaged. After that, the process is temporarily stopped. When the oil temperature of the limited-slip differential clutch 407 is less than the predetermined temperature, the process proceeds to step S102.

In step S102, it is determined whether the torque input to the center differential 40 is greater than or equal to a predetermined torque (for example, 10 Nm). When the torque input to the center differential 40 is less than the predetermined torque, the target clutch torque of the limited-slip differential clutch 407 is set to zero in step S110. After that, in step S112, the target hydraulic pressure of the limited-slip differential clutch 407 is set to zero, and the limited-slip differential clutch 407 is disengaged. After that, the process is temporarily stopped. When the torque input to the center differential 40 is greater than or equal to the predetermined torque, the process proceeds to step S104.

In step S104, it is determined whether the steering angle of the steering wheel 15 is greater than or equal to a predetermined angle (for example, 1°). When the steering angle of the steering wheel 15 is less than the predetermined angle, the process proceeds to step S106. When the steering angle of the steering wheel 15 is greater than or equal to the predetermined angle, the process proceeds to step S108.

In step S106, it is determined whether the pitch angle of the AWD vehicle 3 (road gradient) is greater than or equal to a predetermined angle (for example, 1°). When the pitch angle of the AWD vehicle 3 is less than the predetermined angle, the target clutch torque of the limited-slip differential clutch 407 is set to zero in step S110. After that, in step S112, the target hydraulic pressure of the limited-slip differential clutch 407 is set to zero, and the limited-slip differential clutch 407 is disengaged. After that, the process is temporarily stopped. When the pitch angle of the AWD vehicle 3 is greater than or equal to the predetermined angle, the process proceeds to step S108.

In step S108, the target clutch torque of the limited-slip differential clutch 407 is determined by referring to the map (target clutch torque map) defining the relationship between the torque input to the center differential 40, the steering angle of the steering wheel 15, the pitch angle of the AWD vehicle 3 (road gradient), and the target clutch torque of the limited-slip differential clutch 407.

Subsequently, in step S112, a target clutch hydraulic pressure for the limited-slip differential clutch 407 is set in accordance with the target clutch torque of the limited-slip differential clutch 407 determined in step S108. Then, the hydraulic pressure (that is, the engaging pressure) of the limited-slip differential clutch 407 is controlled so that the actual hydraulic pressure becomes equal to the target clutch hydraulic pressure.

As described in detail above, according to the present embodiment, the reduction ratio of the front-wheel torque transmission system and the reduction ratio of the rear-wheel torque transmission system are set to different ratios, and the front-rear torque distribution ratio of the center differential 40 is initially unequal and is changeable. Since the front-rear torque distribution ratio is initially unequal and is changeable, a variable range of the front-rear torque distribution ratio may be reduced by increasing the initial torque allocated to the driven wheels (for example, the rear wheels) as compared to that in a coupling all-wheel drive vehicle in which the front and rear reduction ratios (gear ratios) are set to different ratios. Accordingly, the engaging pressure (engaging force) of the limited-slip differential clutch 407 can be reduced. Therefore, the amount of heat generated in the limited-slip differential clutch 407 can be reduced and thermal damage to the limited-slip differential clutch 407 can be suppressed (reduced). In addition, since the engaging pressure (engaging force) of the limited-slip differential clutch 407 can be reduced, loss in, for example, the oil pump 62 that generates (increases) the hydraulic pressure can be reduced. As a result, the front-rear torque distribution ratio can be changed from a front-biased ratio to a rear-biased ratio, thermal damage to the limited-slip differential clutch 407 that changes the front-rear torque distribution ratio can be suppressed, and loss in, for example, the oil pump 62 can be reduced.

According to the present embodiment, the front-rear torque distribution ratio of the center differential 40 is initially front biased (torque allocated to the front wheels>torque allocated to the rear wheels). In addition, the gear ratios of the transfer gearset 401, the front differential 44, and/or the rear differential 47 are set so that the reduction ratio of the front-wheel torque transmission system is less than the reduction ratio of the rear-wheel torque transmission system. Therefore, by increasing the engaging pressure of the limited-slip differential clutch 407, the front-rear torque distribution ratio can be changed from a front-biased ratio (initial ratio) to a rear-biased ratio.

According to the present embodiment, the engaging pressure (engaging force) of the limited-slip differential clutch 407 is adjusted during accelerated cornering or accelerated climbing, and the limited-slip differential clutch 407 is disengaged in a driving state other than accelerated cornering or accelerated climbing. Therefore, the region in which the limited-slip differential clutch 407 is activated can be limited, and thermal damage to the limited-slip differential clutch 407 can be more effectively suppressed (reduced).

According to the present embodiment, the engaging pressure (engaging force) of the limited-slip differential clutch 407 is increased when the torque input to the center differential 40 is greater than or equal to a predetermined torque and the steering angle of the steering wheel 15 is greater than or equal to a predetermined angle, or when the torque input to the center differential 40 is greater than or equal to the predetermined torque and the pitch angle of the AWD vehicle 3 (gradient) is greater than or equal to a predetermined angle. Thus, a suitable front-rear torque distribution ratio can be set in accordance with the driving state of the AWD vehicle 3 (as necessary).

According to the present embodiment, the limited-slip differential clutch 407 is disengaged when the oil temperature of the limited-slip differential clutch 407 (continuously variable transmission 30) is higher than or equal to a predetermined temperature. Therefore, thermal damage to the limited-slip differential clutch 407 may be prevented.

Although an embodiment of the disclosure has been described, the disclosure is not limited to the above-described embodiment, and various modifications are possible. For example, in the above-described embodiment, the front-rear torque distribution ratio of the center differential 40 is set to 80:20 (front biased) in the initial state. However, the initial front-rear torque distribution ratio of the center differential 40 is not limited to that in the above-described embodiment (80:20), and may be set to any ratio depending on, for example, conditions. In addition, according to the above-described embodiment, the front-rear torque distribution ratio is changeable in the range of 80:20 to 20:80 by controlling the engaging force of the limited-slip differential clutch 407. However, the variable range of the front-rear torque distribution ratio is not limited to that in the above-described embodiment (80:20 to 20:80) and may be set to any range in accordance with, for example, conditions.

In the above-described embodiment, the reduction ratio (total gear ratio) of the front-wheel torque transmission system is set to a ratio less than the reduction ratio (total gear ratio) of the rear-wheel torque transmission system. However, the reduction ratio (total gear ratio) of the front-wheel torque transmission system may instead be set to a ratio greater than the reduction ratio (total gear ratio) of the rear-wheel torque transmission system.

In the above-described embodiment, the engaging pressure (engaging force) of the limited-slip differential clutch 407 is adjusted in accordance with the torque input to the center differential 40, the steering angle of the steering wheel 15, the pitch angle of the AWD vehicle 3, and the oil temperature of the limited-slip differential clutch 407 (continuously variable transmission 30). However, the operational conditions under which the limited-slip differential clutch 407 is adjusted are not limited to those in the above-described embodiment.

In the above-described embodiment, a chain continuously variable transmission (CVT) is described as an example of an automatic transmission. However, a belt continuously variable transmission or a toroidal continuously variable transmission, for example, may be used instead of the chain continuously variable transmission. Alternatively, a stepped automatic transmission (AT), a manual transmission (MT), or a dual clutch transmission (DCT) may be used instead of the continuously variable transmission.

The above-described configurations of the torque transmission systems (for example, configurations of gear trains and shafts) are examples, and are not limited to those in the above-described embodiment. The configuration of the control system is also not limited to that in the above-described embodiment (that is, the configuration in which the control units are coupled to each other by the CAN 100).

The TCU 70 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the TCU 70. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform all or a part of the functions of the modules illustrated in FIG. 1.

The invention claimed is:

1. An all-wheel drive system comprising:
   a center differential configured to distribute torque input thereto between front wheels and rear wheels of a vehicle;
   a limited-slip differential clutch configured to limit a differential operation of the center differential in accordance with an engaging pressure and change a front-rear torque distribution ratio between the front wheels and the rear wheels;
   a front-wheel torque transmission system configured to transmit torque between the center differential and the front wheels;
   a rear-wheel torque transmission system configured to transmit torque between the center differential and the rear wheels; and
   a controller configured to adjust the engaging pressure of the limited-slip differential clutch based on a driving state of the vehicle,
   wherein a reduction ratio of the front-wheel torque transmission system and a reduction ratio of the rear-wheel torque transmission system are set to be different from each other, and
   wherein the center differential is configured such that the front-rear torque distribution ratio is initially unequal and is changeable.

2. The all-wheel drive system according to claim 1, wherein the front-rear torque distribution ratio of the center differential is initially front biased, and wherein a gear ratio of a transfer gearset, a gear ratio of a front differential, and/or a gear ratio of a rear differential are set so that the reduction ratio of the front-wheel torque transmission system is less than the reduction ratio of the rear-wheel torque transmission system.

3. The all-wheel drive system according to claim 2, wherein the controller adjusts the engaging pressure of the limited-slip differential clutch when the driving state of the vehicle is accelerated cornering or accelerated climbing, and disengages the limited-slip differential clutch in a case where the driving state of the vehicle is other than the accelerated cornering or the accelerated climbing.

4. The all-wheel drive system according to claim 3, wherein the controller disengages the limited-slip differential clutch in a case where an oil temperature of the limited-slip differential clutch is higher than or equal to a predetermined temperature.

5. The all-wheel drive system according to claim 3, wherein the controller increases the engaging pressure of the limited-slip differential clutch in a case where the torque input to the center differential is greater than or equal to a predetermined torque and a steering angle of a steering wheel is greater than or equal to a predetermined angle, or in a case where the torque input to the center differential is greater than or equal to a predetermined torque and a pitch angle of the vehicle is greater than or equal to a predetermined angle.

6. The all-wheel drive system according to claim 5, wherein the controller disengages the limited-slip differential clutch in a case where an oil temperature of the limited-slip differential clutch is higher than or equal to a predetermined temperature.

7. The all-wheel drive system according to claim 1, wherein the controller adjusts the engaging pressure of the limited-slip differential clutch in a case where the driving state of the vehicle is accelerated cornering or accelerated climbing, and disengages the limited-slip differential clutch in a case where the driving state of the vehicle is other than the accelerated cornering or the accelerated climbing.

8. The all-wheel drive system according to claim 7, wherein the controller increases the engaging pressure of the limited-slip differential clutch in a case where the torque input to the center differential is greater than or equal to a predetermined torque and a steering angle of a steering wheel is greater than or equal to a predetermined angle, or in a case where the torque input to the center differential is greater than or equal to a predetermined torque and a pitch angle of the vehicle is greater than or equal to a predetermined angle.

9. The all-wheel drive system according to claim 8, wherein the controller disengages the limited-slip differential clutch in a case where an oil temperature of the limited-slip differential clutch is higher than or equal to a predetermined temperature.

10. The vehicle comprising the all-wheel drive system according to claim 1.

11. The all-wheel drive system according to claim 1, wherein the controller is configured to change the front-rear torque distribution ratio from a front-biased ratio to a rear-biased ratio.

12. An all-wheel drive system comprising:
a center differential configured to distribute torque input thereto between front wheels and rear wheels of a vehicle;
a limited-slip differential clutch configured to limit a differential operation of the center differential in accordance with an engaging pressure and change a front-rear torque distribution ratio between the front wheels and the rear wheels;
a front-wheel torque transmission system configured to transmit torque between the center differential and the front wheels;
a rear-wheel torque transmission system configured to transmit torque between the center differential and the rear wheels; and
a controller configured to adjust the engaging pressure of the limited-slip differential clutch based on a driving state of the vehicle,
wherein a reduction ratio of the front-wheel torque transmission system and a reduction ratio of the rear-wheel torque transmission system are set to be different from each other, and
wherein the center differential is configured such that the front-rear torque distribution ratio is initially unequal and is changeable,
wherein the controller adjusts the engaging pressure of the limited-slip differential clutch in a case where the driving state of the vehicle is accelerated cornering or accelerated climbing, and disengages the limited-slip differential clutch in a case where the driving state of the vehicle is other than the accelerated cornering or the accelerated climbing,
wherein the controller disengages the limited-slip differential clutch in a case where an oil temperature of the limited-slip differential clutch is higher than or equal to a predetermined temperature.

13. A program for an all-wheel drive system stored in a non-transitory computer readable medium, the all-wheel drive system, comprising
a center differential configured to distribute torque input thereto between front wheels and rear wheels of a vehicle,
a limited-slip differential clutch configured to limit a differential operation of the center differential in accordance with an engaging pressure and change a front-rear torque distribution ratio between the front wheels and the rear wheels,
a front-wheel torque transmission system configured to transmit torque between the center differential and the front wheels, and
a rear-wheel torque transmission system configured to transmit torque between the center differential and the rear wheels,
the program executable by processor and configured to:
adjust the engaging pressure of the limited-slip differential clutch based on a driving state of the vehicle; and
setting a reduction ratio of the front-wheel torque transmission system and a reduction ratio of the rear-wheel torque transmission system to be different from each other, and
wherein the center differential is configured such that the front-rear torque distribution ratio is initially unequal and is changeable.

14. The program for the all-wheel drive system according to claim 13, wherein the front-rear torque distribution ratio of the center differential is initially front biased, and wherein a gear ratio of a transfer gearset, a gear ratio of a front differential, and/or a gear ratio of a rear differential are set so that the reduction ratio of the front-wheel torque transmission system is less than the reduction ratio of the rear-wheel torque transmission system.

15. The program for the all-wheel drive system according to claim 14, further comprising adjusting the engaging pressure of the limited-slip differential clutch in a case where the driving state of the vehicle is accelerated cornering or accelerated climbing, and disengages the limited-slip differential clutch in a case where the driving state of the vehicle is other than the accelerated cornering or the accelerated climbing.

16. The program for the all-wheel drive system according to claim 14, further comprising increasing the engaging pressure of the limited-slip differential clutch in a case where the torque input to the center differential is greater than or equal to a predetermined torque and a steering angle of a steering wheel is greater than or equal to a predetermined angle, or in a case where the torque input to the center differential is greater than or equal to a predetermined torque and a pitch angle of the vehicle is greater than or equal to a predetermined angle.

17. The program for the all-wheel drive system according to claim 14, further comprising disengaging the limited-slip differential clutch in a case where an oil temperature of the limited-slip differential clutch is higher than or equal to a predetermined temperature.

18. The program for the all-wheel drive system according to claim 13, further comprising adjusting the engaging pressure of the limited-slip differential clutch in a case where the driving state of the vehicle is accelerated cornering or accelerated climbing, and disengages the limited-slip differential clutch in a case where the driving state of the vehicle is other than the accelerated cornering or the accelerated climbing.

19. The program for the all-wheel drive system according to claim 13, further comprising increasing the engaging pressure of the limited-slip differential clutch in a case where the torque input to the center differential is greater than or equal to a predetermined torque and a steering angle of a steering wheel is greater than or equal to a predetermined angle, or in a case where the torque input to the center differential is greater than or equal to a predetermined torque and a pitch angle of the vehicle is greater than or equal to a predetermined angle.

20. The program for the all-wheel drive system according to claim 13, further comprising disengaging the limited-slip differential clutch in a case where an oil temperature of the limited-slip differential clutch is higher than or equal to a predetermined temperature.

* * * * *